United States Patent [19]

Iwata et al.

[11] Patent Number: 4,931,810

[45] Date of Patent: Jun. 5, 1990

[54] INK-JET RECORDING SYSTEM

[75] Inventors: Kazuo Iwata, Yokohama; Osamu Nishiwaki, Atsugi; Shinichi Tochihara, Hadano, all of Japan

[73] Assignee: Canon Kabushiki Kaisha, Tokyo, Japan

[21] Appl. No.: 370,070

[22] Filed: Jun. 23, 1989

Related U.S. Application Data

[63] Continuation of Ser. No. 136,716, Dec. 22, 1987, abandoned.

[30] Foreign Application Priority Data

Dec. 24, 1986 [JP] Japan ................... 61-309441
Dec. 4, 1987 [JP] Japan ................... 62-307282

[51] Int. Cl.$^5$ .................... G01D 15/16; B41J 3/04
[52] U.S. Cl. ................... 346/1.1; 346/140 R; 346/135.1
[58] Field of Search ............. 346/1.1, 140, 75, 135.1

[56] References Cited

U.S. PATENT DOCUMENTS

| | | | |
|---|---|---|---|
| 4,295,889 | 10/1981 | Eida et al. | 106/22 |
| 4,330,787 | 5/1982 | Sato et al. | |
| 4,381,946 | 5/1983 | Uehara et al. | 106/22 |
| 4,440,827 | 4/1984 | Miyamoto et al. | 428/327 |
| 4,460,637 | 7/1984 | Miyamoto | 346/135.1 X |
| 4,478,910 | 10/1984 | Oshima et al. | 428/331 |
| 4,503,111 | 3/1985 | Jaeger et al. | 428/195 |
| 4,521,805 | 6/1985 | Ayata | 358/75 |
| 4,542,059 | 9/1985 | Toganoh | 346/135.1 X |
| 4,636,805 | 1/1987 | Toganoh | 346/1.1 |
| 4,675,693 | 6/1987 | Yano et al. | |
| 4,701,837 | 10/1987 | Sakaki | 346/1.1 X |

FOREIGN PATENT DOCUMENTS 0174859 3/1986 European Pat. Off. .
60-172582 9/1985 Japan .

OTHER PUBLICATIONS

Itoh, et al., "High Optical Density Recording Paper for Ink-Jet Printing", National Technical Report, vol. 28, No. 6, Dec. 1982, and excerp translation.
Diconix, Dijit 1.

*Primary Examiner*—Joseph W. Hartary
*Attorney, Agent, or Firm*—Fitzpatrick, Cella, Harper & Scinto

[57] ABSTRACT

There is disclosed ink-jet recording process for carrying out a recording by adhering ink droplets on a recording medium, wherein the recording is carried out under the condition that the ink is adhered in an amount ranging between $3.0 \times 10^5$ pl/cm$^2$ and $3.0 \times 10^6$ pl/cm$^2$ in solid image recording when the recording is carried out with a recording density of 10 dots/mm $\times$ 10 dots/mm or more.

34 Claims, No Drawings

INK-JET RECORDING SYSTEM

This application is a continuation of application Ser. No. 07/136,716 filed Dec. 22, 1987, now abandoned.

BACKGROUND OF THE INVENTION

1. Field of the Invention

The present invention relates to an ink-jet recording process for recording information such as images, letters and symbols on paper, light-transmissive recording medium or the like using an ink-jet recording apparatus.

2. Related Background Art

Ink-jet recording is known as a superior recording method which is not particularly demanding in choice of recording mediums, and so research and development have been extensively made on recording apparatus, recording processes and recording mediums.

However, in the ink-jet recording apparatus developed and made commercially available, it has actually been impossible to simultaneously obtain;

(i) a recorded image having a high optical density (OD);
(ii) a recorded image which is good in print quality and free from any feathering on the peripheral part of letters or images; and
(iii) a good drying time characteristic;

unless there are used recording mediums developed for exclusive use in an ink-jet recording which are called ink-jet recording paper or ink-jet recording transparenty films.

The above performances (i) to (iii) can not be simultaneously satisfied when recording is carried out on recording media such as paper including electrophotographic recording paper (PPC paper), letter paper, bond paper, post cards, writing paper, envelopes, report paper, etc. generally used in offices, homes, etc. and transparent films (OHP films) with use of conventionally known ink-jet recording apparatus. Even when an ink-jet recording paper is used, there has also been accompanied with the disadvantage such that recording can not be performed on both sides thereof since most ink-jet recording paper is only a one-side coated paper, and thus the grade of prints and the drying time characteristic may be lowered if recording is carried out on the side on which no coating was applied. Thus, various developments have been made for the purpose of obtaining recorded images;

(i) which are not particular in choice of recording faces (or are not particular in choice of materials such as paper or films and of the reverse side or obverse side thereof);
(ii) which have a high optical density;
(iii) which are good in print quality and free from feathering; and
(iv) which have a good drying time characteristic; and there have been developed (1) a process in which recording is carried out using a strongly alkaline ink of about pH 13 (Japanese Laid-Open Patent Application No. 102970/1982) and (2) a process in which recording is carried out using an ink-jet recording apparatus of a continuous type such as a charge-controlled type, etc.

However, it is known in the process of (1) that an ink so strongly alkaline can be dangerous to handle, that although good printing can be performed on acidic sized paper employing rosin or the like, there are posed the disadvantages such that both drying time characteristic and quality of prints may be greatly lowered when there is used neutral paper employing an alkyl ketone dimer or the like, and also that strike-through tends to occur probably because of large permeability of the ink into the paper.

In the process of the above (2), although it is a process that can achieve a recording of a relatively high density, there are limitations in the precision of the nozzles from which an ink is ejected, and thus fine ink droplets can be stably ejected only with difficulty. As a result, unless the recording density is controlled to substantially no more than about 9.5 dots/mm (240 dots/inch), the drying time characteristic may be lowered (i.e., the recording surface may be soiled when smeared with fingers) and the irregular spreading of dots (feathering) may occur, because of an overly large amount of the ink to be fixed on the recording face, so that there is obtained a low print quality, i.e., a recorded image having blurred peripheral parts.

With the recording density of about 9.5 dots/mm, there have been accompanied with the disadvantages such that it is impossible to carry out sharp printing for close (or tight) chinese characters (such as " 讀 ") or sometimes difficult to carry out the recording that can be smooth and natural in oblique line part or curved line part such as "/", "⊃" or "O", and every dot can be visually observed, giving recorded images of conspicuous ruggedness and lower grade.

The prior art includes the following documents relating to the below-listed ink-jet recording conditions:

1. Amount of ink adherence per unit area.

Itoh et al., "High Optical Density Recording Paper for Ink-Jet Printing," *National Technical Report*, Vol. 28, No. 6, Dec. 1982, discusses ejecting different amounts of ink and evaluating recording quality, as pointed out in Table 2 (which discloses ejecting up to 9.4 pl/cm$^2$ of ink) and FIG. 2b (which shows a pattern printed at 2 lines/mm);

U.S. Pat. No. 4,503,111 discusses recording with ink coverage at 1.5 $\mu$l/cm$^2$ (column 5, lines 1-3; see also column 6, lines 61-63); and Japanese Laid-Open Patent Application No. 60-172582 discloses that the maximum amount of ink applied to recording paper is 3.5 mg/cm$^2$, which, if the specific gravity of the ink is assumed to be 1.0, is $3.5 \times 10^6$ pl/cm$^2$.

2. Concentration of colorants in inks.

U.S. Pat. No. 4,381,946 discloses dye concentration in inks of 0.5% to 8% by weight (column 4, line 8-18); and U.S. Pat. No. 4,295,889 discloses dye concentrations in inks of 0.1% to 20% by weight (column 4, lines 44-48).

3. Paper basis weight.

U.S. Pat. No. 4,440,827 discloses recording paper with a basis weight of 70 to 83 g/m$^2$ (columns 6 and 8, Tables 1 and 9);

U.S. Pat. No. 4,478,910 describes recording paper with a basis weight of 60 to 85 g/m$^2$ (columns 4-6, Tables 1 and 2); and European Patent Application 174,859 discloses recording paper with a basis weight of 50 to 90 g/m$^2$ having an ink acceptor layer.

4. Ink solvent boiling point.

U.S. Pat. No. 4,295,889 (see No. 2 above) discloses the following solvents for inks, which have the following boiling points:

| Solvent | Boiling Point (°C.) |
|---|---|
| Methyl alcohol | 64.5 |
| Ethyl alcohol | 78 |
| n-Propyl alcohol | 97 |
| iso-Propyl alcohol | 82.7 |
| n-Butyl alcohol | 118 |
| sec-Butyl alcohol | 98.5 |
| tert-Butyl alcohol | 82.5 |
| iso-Butyl alcohol | 108 |
| Dimethylformamide | 153 |
| Dimethylacetamide | 165 |
| Acetone | 56.5 |
| Diacetone alcohol | 167.9 |
| Tetrahydrofuran | 64–65 |
| Dioxane | 101 |
| Polyethylene glycol | >300 |
| Polypropylene glycol | >300 |
| Ethylene glycol | 197 |
| Propylene glycol | 188.2 |
| Butylene glycol | 190.5 |
| Triethylene glycol | 179 |
| Thiodiglycol | 282 |
| Hexylene glycol | 197 |
| Diethylene glycol | 245 |
| Glycerol | 290 |
| Ethylene glycol methyl ether | 124.5 |
| Diethylene glycol methyl ether | 194.2 |
| Diethylene glycol ethyl ether | 195 |
| Triethylene glycol monomethyl ether | 249 |
| N-Methyl-2-pyrrolidone | 202 |
| 1,3-Dimethyl-2-imidazolinone | 226. |

SUMMARY OF THE INVENTION

Accordingly, an object of the present invention is to provide an ink-jet recording process capable of performing a recording;

(i) which is not especially particular in choice of recording faces (or is not particular in choice of materials such as paper or films and of the reverse side or obverse side thereof);
(ii) which achieves a high optical density;
(iii) which is good in print quality and free from feathering; and
(iv) which achieves a good drying time characteristic;

A further object of the present invention is to provide an ink-jet recording process which can smoothly and naturally reproduce a complicated chinese character / or an oblique or curved line part of an image.

The above objects can be achieved by the present invention as described below.

The present invention is to provide an ink-jet recording process for recording by adhering ink droplets on a recording medium, wherein ink is adhered in an amount ranging between $3.0 \times 10^5$ pl/cm$^2$ and $3.0 \times 10^6$ pl/cm$^2$ in solid image recording at a recording density of 10 dots/mm × 10 dots/mm or more.

In another embodiment of the present invention, there is provided an ink-jet recording process for recording by adhering ink droplets on a recording medium, wherein ink is adhered in an amount ranging between $1.0 \times 10^6$ pl/cm$^2$ and $2.0 \times 10^6$ pl/cm$^2$ in solid image recording with a recording density of 14 dots/mm × 14 dots/mm or more.

In a further embodiment of the present invention, there is provided an ink-jet recording process for recording by adhering ink droplets on a recording medium, wherein said ink contains 1 to 45% by weight of an organic solvent having a boiling point of 150° C. or more, and the ink is adhered in an amount ranging between $3.0 \times 10^5$ pl/cm$^2$ and $3.0 \times 10^6$ pl/cm$^2$ in solid image recording with a recording density of 10 dots/mm × 10 dots/mm or more.

In a still further embodiment of the present invention, there is provided an ink-jet recording process for recording by adhering ink droplets on a recording medium, wherein said ink contains 1 to 45% by weight of an organic solvent having a boiling point of 150° C. or more, and the ink is adhered in an amount ranging between $1.0 \times 10^6$ pl/cm$^2$ and $2.0 \times 10^6$ pl/cm$^2$ in solid image recording with a recording density of 14 dots/mm × 14 dots/mm or more.

DETAILED DESCRIPTION OF THE PREFERRED EMBODIMENTS

A first feature of the present invention is to use an ink-jet recording apparatus with a recording density of 10 dots/mm × 10 dots/mm (length × width) or more.

This is based on the fact that the present inventors have researched and studied on the relationship between the recording density and the "looks" and have found that the curved line part and the oblique line part appear to be smooth and natural in feeling if the recording density is 10 dots/mm × 10 dots/mm or more.

In the case that a recording density is at a level as low as about 8 dots/mm × 8 dots/mm or less, the size of every dot is so large that the abnormality such as white-spotting, color non-uniformity or density non-uniformity tended to become conspicuous if mis-direction of ink ejection occur for some reason (for example, because of dust sticking to a part of the nozzles).

In contrast thereto, it was also found that with a recording density of 10 dots/mm × 10 dots/mm or more, the dot is originally so small that such abnormality favorably becomes hardly conspicuous since only a very narrow streak (white-spotting), or non-uniformity in color or density was produced even when the misdirection of ejection occurred.

In the case when recording was carried out with a recording density of about 4 to 8 dots/mm × 4 to 8 dots/mm and using ink droplets of large size, it was further found that ink droplets impinge on the recording face before previously impinged droplets permeate into the recording face when the succeeding ink droplets are immediately follow the earlier ink droplets face, so that the ink is splashed around the dots at the part which overlap, and soil the recording face.

In the present invention, recording can be satisfactorily performed when a recording density is in the range of 10 dots/mm × 10 dots/mm or more, preferably in the range of from 10 dots/mm × 10 dots/mm to 24 dots/mm × 24 dots/mm, more preferably in the range of from 14 dots/mm × 14 dots/mm to 24 dots/mm × 24 dots/mm.

In the present invention, recording can also be satisfactorily performed employing the on-demand system with multi-nozzles.

The function of the multi-nozzles herein mentioned is that a plurality of nozzles are used for forming one image and adjacent dots are substantially applied in printing simultaneously.

A second feature of the present invention resides in the range of the amount of the ink to be adhered on the recording face.

More specifically, all of the objects of the present invention can be satisfied at the same time by setting to a given range the amount of the ink to be adhered on the recording face.

If the ink is adhered in a smaller amount, a colorant on the recording face can be present only in a smaller quantity, bringing about the disadvantage that the optical density of recorded images decreases to give unsharp recorded images having the impression that they are faint as a whole.

If a concentration of the dye in the ink is set to be 10% by weight or more, a sufficient OD value can be attained, but in recording apparatus having multi-nozzles, a nozzle or nozzles not in use for recording may be clogged with the ink, resulting in uselessness in practical purposes.

However, if ink is adhered on the recording face in a greater amount, the drying time characteristic tends to be extremely lowered under the conditions shown below, even if the colorant is contained in the ink in a decreased amount for example;

(i) under the condition of a high humidity atmosphere:
   (Drying time characteristic is lowered because the recording medium has absorbed moisture and also components in an ink evaporate slower from the surface of the recording medium.)
(ii) under the condition of a low temperature:
   (It is lowered because medium components in an ink evaporate slower if an atmospheric temperature is low.)
(iii) in the case that recording is performed on strongly size paper:
   (Since sizing is applied so as to prevent the feathering, it takes a long time for an ink to permeate into the inside of the paper. Therefore, drying time characteristic is lowered.)

When the ink is adhered on the recording face in a greater amount and also the colorant is contained in a greater amount, there is also posed the disadvantage that the recorded images may be extremely soiled if they are smeared with sweaty fingers or the like.

Now, to achieve the objects of the present invention, the present inventors have studied under the varied conditions regarding the amount of the ink to be adhered on the recording face. As a result, they found that the recording may preferably be carried out under the condition that the amount ranges preferably between $3.0 \times 10^5$ pl/cm$^2$ and $3.0 \times 10^6$ pl/cm$^2$, more preferably between $5.0 \times 10^5$ pl/cm$^2$ and $2.5 \times 10^6$ pl/cm$^2$, and most preferably between $1.0 \times 10^6$ pl/cm$^2$ and $2.0 \times 10^6$ pl/cm$^2$, in solid image recording, and thus reached the present invention.

Also in the case that color-mixed areas are formed on a recording medium with use of two or more kinds of inks of different colors as in a color printer, recording may preferably be carried out using the ink ranges described above.

For example, in the case that a yellow area is formed on the recording medium with use of yellow ink and a green area is formed by overlapping cyan ink on it, if follows that the ink is adhered on the recording medium in an amount twice the amount used in the instance of the monochrome. Thus, the amount of the ink to be adhered at the color mixed areas is required to be controlled within the range described above.

To described an ink used in the present invention, various dyes and colorants can be used as coloring matters, and the type amount thereof may be selected depending on what purposes they will be used for and also taking account of the clogging of nozzles and so forth.

As for a concentration of the dye, it can be suitably used in the range of 0.5 to 10.0% by weight, preferably in the range of 1.0 to 5.0% by weight, and more preferably in the range of 1.0 to 3.0% by weight based on the total amount of the ink, taking account of the optical density of recorded images.

A liquid medium for dissolving or dispersing the colorant may be any of aqueous systems in which water and water-soluble organic solvents such as glycols and glycol ethers are used in combination and non-aqueous systems containing aromatic type, aliphatic type, ester type or ether type water-insoluble organic solvents. However, taking account of the safety, smell, strike-through of paper, etc., aqueous systems are preferred.

The present inventors have further studied an organic solvent contained in the ink. As a result, they found that better results can be obtained when the ink contains 1 to 45% by weight of an organic solvent having a boiling point of 150° C. or more.

If the organic solvent having a boiling point of 150° C. or more, among the organic solvents contained in the ink, is contained in the amount more than 45% by weight, it tends to take a long time for the solvent to evaporate from or to permeate into the recording face, so that the drying time characteristic is lowered.

It was also confirmed that, particularly in respect of an organic solvent having a boiling point of 300° C. or more, if contained in the ink in an amount of 10% by weight or more, the drying time tends to be lowered and the ink tends to permeate into the recording medium slower even when the remaining part of the ink is constituted only by solvent having a boiling point of 150° C. or less such as water, alcohol and aliphatic hydrocarbons, so that the "whiskers" called feathering are likely to appear, making it impossible to obtain excellent images and good print quality.

The organic solvent having a boiling point of 150° C. or more may be contained more preferably in the range of from 1 to 30% by weight, still more preferably in the range of from 1 to 25% by weight, and most preferably in the range of from 5 to 20% by weight. In respect of the organic solvent having a boiling point of 300° C. or more, it may be contained more preferably in the range of 5% by weight or less.

With regard to the organic solvent having a boiling point of 150° C. or more, the dry time characteristic is considered of common knowledge, to improve as the solvent is contained in a smaller amount, although not if the solvent is contained in an overly small amount. Thus, it may desirably be contained in an amount of 1% by weight or more, preferably 5% by weight or more.

The recording medium to be used may be any of coated paper and ordinary paper, but particularly effective for the present invention is paper having a basis weight in the range of from 45 to 200 g/m$^2$.

The amount of ink to be adhered (pl/cm$^2$), as used in the present invention, can be readily determined by any of the methods in which;

(1) it is determined from the decreased amount, measured after solid image recording, of the ink in an ink tank connected to nozzles, and the area of the solid image recording; and (2) it is determined from the amount of the ink ejected from one nozzle according to one signal, and the recording density.

The present invention will be described in greater detail by the following Examples and Comparative Examples.

EXAMPLE 1

Prepared was ink having the following composition.

| | |
|---|---|
| C.I. Direct Black 62 | 3.0 wt. % |
| Ethanol (b.p. 78° C.) | 0.5 wt. % |
| Ethylene glycol (b.p. 197° C.) | 20.0 wt. % |
| Diethylene glycol (b.p. 245° C.) | 5.0 wt. % |
| Water | 71.5 wt. % |

Using this ink and an ink-jet recording apparatus having a multi-nozzle on-demand type head having 48 nozzles, ink-jet recording was performed at a recording density of 14.2 dots/mm×14.2 dots/mm (360 dots/inch×360 dots/inch) on the five kinds of paper (A) to (E) shown below under the solid image recording condition such that the volume of ink ejected from one nozzle according to one signal was 58 pl, in other words, the ink was adhered on the recording face in an amount of $1.2 \times 10^6$ pl/cm$^2$.

As a result, the resulting recorded images had an optical density (OD) of 1.2 in an average value.

The drying time (the shortest time by which the recorded images are not soiled if they are smeared with filter paper) under 80% RH at 15° C. was also found to be 52 seconds in an average value; and the drying time under 55% RH at 20° C., 41 seconds in an average value.

The looks of recorded images were overall evaluated by 10 panelists in respect of optical density, grade, presence of feathering, and reproducibility of an image at an oblique-line part and a curved line part thereof, to find that the five rank evaluation (5: very good . . . 1: very poor) was 4.2 in an average value, showing a good result.

Ink-jet recording was also performed according to the process of the present invention on a transparent film comprising a polyester film coated with a mixture of polyvinyl alcohol and polyvinyl pyrrolidone. As a result, there were obtained good recorded images.

Paper for recorded image evaluation:
(A): Canon Paper NP-DRY (available from Canon Inc.; PPC paper)
(B): Xerox 4024 DP (available from Xerox Corp.; PPC paper)
(C): Hammermill Bond (available from Hammermill paper Corp.; bond paper)
(D): Gilbert Bond (available from Mead Corp.; bond paper)
(E): New OK (available from Oji Paper Co., Ltd.; wood free paper)

EXAMPLES 2 TO 9

Using the inks having the composition shown below in (2) to (9), recordings were performed in the same manner as in Example 1 but under the conditions as shown in Table 1. As a result, there were obtained good results in all, as shown in Table 2.

| | |
|---|---|
| (2): | |
| C.I. Food Black 2 | 1.4 wt. % |
| C.I. Direct Yellow 86 | 0.1 wt. % |
| Diethylene glycol | 8.0 wt. % |
| n-Propyl alcohol (b.p. 97° C.) | 5.0 wt. % |
| Water | 85.5 wt. % |
| (3): | |
| C.I. Acid Black 52 | 2.5 wt. % |
| Glycerol (b.p. 290° C.) | 17.5 wt. % |
| Ethylene glycol | 5.0 wt. % |
| Methanol (b.p. 64.5° C.) | 4.0 wt. % |
| Water | 71.0 wt. % |
| (4): | |
| C.I. Direct Blue 199 | 2.0 wt. % |
| Diethylene glycol | 15.0 wt. % |
| n-Butanol (b.p. 118° C.) | 1.0 wt. % |
| Water | 82.0 wt. % |
| (5): | |
| C.I. Direct Black 154 | 2.0 wt. % |
| Thiodiethanol (b.p. 282° C.) | 14.0 wt. % |
| Glycerol | 6.0 wt. % |
| Ethanol | 4.0 wt. % |
| Water | 74.0 wt. % |
| (6): | |
| C.I. Acid Red 8 | 5.0 wt. % |
| Polyethylene glycol 200 (b.p. > 300° C.) | 3.0 wt. % |
| Ethylene glycol | 30.0 wt. % |
| Water | 62.0 wt. % |
| (7): | |
| C.I. Food Black 2 | 1.4 wt. % |
| C.I. Direct Yellow 86 | 0.1 wt. % |
| Glycerol | 10.0 wt. % |
| Thiodiethanol | 10.0 wt. % |
| Water | 78.5 wt. % |
| (8): | |
| C.I. Solvent Black 29 | 1.0 wt. % |
| Benzyl alcohol (b.p. 205° C.) | 20.0 wt. % |
| Methyl cellosolve (b.p. 125° C.) | 10.0 wt. % |
| Ethanol | 69.0 wt. % |
| (9): | |
| C.I. Food Black 2 | 2.6 wt. % |
| C.I. Direct Red 227 | 0.2 wt. % |
| C.I. Direct Yellow 86 | 0.2 wt. % |
| Diethylene glycol | 11.0 wt. % |
| Ethylene glycol | 5.0 wt. % |
| Ethanol | 3.0 wt. % |
| Water | 78.0 wt. % |

EXAMPLES 10 AND 11

Using ink having the same composition as in Example 9, recording was performed in the same manner as in Example 1 but under the conditions as shown in Table 1. As a result, there were obtained good results in all, as shown in Table 2.

EXAMPLE 12

Prepared were ink (Y) and ink (C) of the following composition.

| | |
|---|---|
| Ink (Y): | |
| C.I. Direct Yellow 86 | 1.5 wt. % |
| Diethylene glycol | 20.0 wt. % |
| Ethanol | 5.0 wt. % |
| Water | 73.5 wt. % |
| Ink (C): | |
| C.I. Direct Blue 199 | 2.5 wt. % |
| Diethylene glycol | 20.0 wt. % |
| Ethanol | 5.0 wt. % |
| Water | 72.5 wt. % |

Using ink (Y) and ink (C) and also using an ink jet recording apparatus having two multi-nozzle on-demand type heads each having a nozzle number of 256, ink jet recording for green images was peformed at a recording density of 15.7 dots/mm×15.7 dots/mm (400 dots/inch×400 dots/inch) on the five kinds of paper (A) to (E) shown in Example 1 by making a print in an overlapping fashion under the solid image recording condition such that the volume of ink ejected from one nozzle in each head according to one signal was 35 pl, in other words, the ink was adhered on the recording face in an amount of $1.7 \times 10^6$ pl/cm$^2$ as a result.

As a result, the resulting recorded images had an optical density (OD) of 1.3 in an average value.

The drying time under 80% RH at 15° C. was also found to be 47 seconds; and under 55% RH at 20° C., 32 seconds; both in average values.

The overall evaluation point was 4.2, showing good results.

COMPARATIVE EXAMPLES 1 AND 2

Using the ink having the following composition, the recording was carried out in the same manner as in Example 1 but under the conditions as shown in Table 1. Results obtained are shown in Table 2.

| | |
|---|---|
| C.I. Food Black 2 | 1.9 wt. % |
| C.I. Direct Yellow 86 | 0.1 wt. % |
| Glycerol | 15.0 wt. % |
| Triethylene glycol (b.p. 288° C.) | 8.0 wt. % |
| Water | 75.0 wt. % |

COMPARATIVE EXAMPLES 3 AND 4

Using the ink having the following composition, the recording was carried out in the same manner as in Example 1 but under the conditions as shown in Table 1. The results obtained are shown in Table 2.

| | |
|---|---|
| C.I. Food Black 2 | 2.9 wt. % |
| C.I. Direct Yellow 86 | 0.1 wt. % |
| Ethylene glycol | 5.0 wt. % |
| Diethylene glycol | 10.0 wt. % |
| Ethanol | 2.0 wt. % |
| Water | 70.0 wt. % |

TABLE 1

| | Recording density dots/mm$^2$ (DPI)*1 | Nozzle number | *2 Ink volume (pl) | *3 Amount of ink adhered (pl/cm$^2$) |
|---|---|---|---|---|
| Examples: | | | | |
| 2 | 11.8 × 11.8 (300 × 300) | 50 | 51 | 7.1 × 10$^5$ |
| 3 | 15.7 × 15.7 (400 × 400) | 128 | 15 | 3.7 × 10$^5$ |
| 4 | 18.9 × 18.9 (480 × 480) | 64 | 45 | 1.6 × 10$^6$ |
| 5 | 14.2 × 14.2 (360 × 360) | 48 | 88 | 1.8 × 10$^6$ |
| 6 | 11.3 × 11.3 (288 × 288) | 36 | 195 | 2.5 × 10$^6$ |
| 7 | 11.8 × 23.6 (300 × 600) | 50 | 78 | 2.2 × 10$^6$ |
| 8 | 11.8 × 11.8 (300 × 300) | 50 | 204 | 2.8 × 10$^6$ |
| 9 | 15.7 × 15.7 (400 × 400) | 256 | 44 | 1.1 × 10$^6$ |
| 10 | 14.2 × 14.2 (360 × 360) | 64 | 67 | 1.3 × 10$^6$ |
| 11 | 18.9 × 18.9 (480 × 480) | 128 | 35 | 1.4 × 10$^6$ |
| Comparative Examples: | | | | |
| 1 | 9.4 × 9.4 (240 × 240) | 32 | 120 | 1.1 × 10$^6$ |
| 2 | 14.2 × 14.2 (360 × 360) | 48 | 203 | 4.1 × 10$^6$ |
| 3 | 15.7 × 15.7 (400 × 400) | 128 | 11 | 2.7 × 10$^5$ |
| 4 | 7.1 × 7.1 (180 × 180) | 24 | 102 | 5.1 × 10$^5$ |

*1 DPI = Dots/inch
*2 The volume of ink ejected from one nozzle according to one signal.
*3 The amount of ink adhered in solid image recording.

TABLE 2

| | Optical density (OD) | Dry time (sec) 15° C., 80% RH | Dry time (sec) 20° C., 55% RH | Overall evaluation |
|---|---|---|---|---|
| Examples: | | | | |
| 2 | 1.1 | 37 | 24 | 4.1 |
| 3 | 0.9 | 31 | 20 | 3.9 |
| 4 | 1.2 | 31 | 26 | 4.3 |
| 5 | 1.3 | 45 | 36 | 4.4 |
| 6 | 1.6 | 54 | 44 | 4.0 |
| 7 | 1.4 | 42 | 30 | 4.1 |
| 8 | 0.9 | <5 | <5 | 4.0 |
| 9 | 1.4 | 35 | 20 | 4.4 |
| 10 | 1.5 | 27 | 15 | 4.3 |
| 11 | 1.5 | 33 | 26 | 4.5 |
| Comparative Examples: | | | | |
| 1 | 0.8 | 50 | 41 | 3.1 |
| 2 | 1.6 | 143 | 115 | 2.4 |
| 3 | 0.5 | 37 | 22 | 1.9 |
| 4 | 0.7 | 73 | 46 | 2.1 |

As described above, the present invention can provide good images with superior ink fixing performance and optical density of images which are also free from feathering, even when ordinary paper is used in high density recording.

We claim:

1. A multi-nozzle ink-jet recording process comprising the steps of:
    ejecting ink droplets; and
    adhering said ink droplets on a recording medium at a recording density of at least 100 dots/mm$^2$ and $3.0 \times 10^6$ pl/cm$^2$.

2. The ink-jet recording process of claim 1, wherein said recording process is an on-demand system.

3. The ink-jet recording process of claim 1, wherein said recording density is at most 576 dots/mm$^2$.

4. The ink-jet recording process of claim 2, wherein said recording density is at least 196 dots/mm$^2$.

5. The ink-jet recording process of claim 1, wherein said ink is adhered in an amount ranging between $5.0 \times 10^5$ pl/cm$^2$ and $2.5 \times 10^6$ pl/cm$^2$.

6. The ink-jet recording process of claim 1, wherein said ink is adhered in an amount ranging between $1.0 \times 10^6$ pl/cm$^2$ and $2.0 \times 10^6$ pl/cm$^2$.

7. The ink-jet recording process of claim 1, wherein said ink contains a colorant in the range of 0.5 to 10% by weight.

8. The ink-jet recording process of claim 1, wherein said recording medium is a sheet of paper having a basis weight ranging between 45 and 200 g/m$^2$.

9. A multi-nozzle ink-jet recording process comprising the steps of:
    ejecting ink droplets; and
    adhering said ink droplets on a recording medium at a recording density of at least 196 dots/mm$^2$, in an amount ranging between $1.0 \times 10^6$ and $2.0 \times 10^6$ pl/cm$^2$.

10. The ink-jet recording process of claim 9, wherein said recording process is an on-demand system.

11. The ink-jet recording process of claim 9, wherein said recording density is at most 576 dots/mm$^2$.

12. The ink-jet recording process of claim 9, wherein said ink contains a colorant in the range of 0.5 to 10% by weight.

13. The ink-jet recording process of claim 9, wherein said recording medium is a sheet of paper having a basis weight ranging between 45 and 200 g/m$^2$.

14. A multi-nozzle ink-jet recording process comprising the steps of:
    selecting an ink containing 1 to 45% by weight of an organic solvent having a boiling point of at least 150° C.;
    ejecting droplets of said ink; and adhering said ink droplets on a recording medium at a recording density of at least 100 dots/mm$^2$ in an amount ranging between $3.0 \times 10^5$ and $3.0 \times 10^6$ pl/cm$^2$.

15. The ink-jet recording process of claim 14, wherein said recording density is at most 576 dots/mm$^2$.

16. The ink-jet recording process of claim 15, wherein said recording density is at least 196 dots/mm$^2$.

17. The ink-jet recording process of claim 14, wherein said ink is adhered in an amount ranging between $5.0 \times 10^5$ pl/cm$^2$ and $2.5 \times 10^6$ pl/cm$^2$.

18. The ink-jet recording process of claim 14, wherein said ink is adhered in an amount ranging between $1.0 \times 10^6$ pl/cm$^2$ and $2.0 \times 10^6$ pl/cm$^2$.

19. The ink-jet recording process of claim 14, wherein said ink contains a colorant in the range of 0.5 to 10% by weight.

20. The ink-jet recording process of claim 14, wherein said recording medium is a sheet of paper having a basis weight ranging between 45 and 200 g/m$^2$.

21. A multi-nozzle ink-jet recording process comprising the steps of:
    selecting an ink containing 1 to 45% by weight of an organic solvent having a boiling point of at least 150° C.;
    ejecting droplets of said ink; and
    adhering said ink droplets on a recording medium at a recording density of at least 196 dots/mm$^2$ in an amount ranging between $1.0 \times 10^6$ and $2.0 \times 10^6$ pl/cm$^2$.

22. The ink-jet recording process of claim 21, wherein said recording density is at most 576 dots/mm$^2$.

23. The ink-jet recording process of claim 21, wherein said ink contains a colorant in the range of 0.5 to 10% by weight.

24. The ink-jet recording process of claim 21, wherein said recording medium is a sheet of paper having a basis weight ranging between 45 and 200 g/m$^2$.

25. The ink-jet recording process of claim 23, wherein said recording process is an on-demand system.

26. The ink-jet recording process of claim 20, wherein said recording process is an on-demand system.

27. A multi-nozzle ink-jet recording process for forming a color image with inks of different colors, which comprises the steps of:
    ejecting droplets of said inks of different colors; and
    adhering said ink droplets on a recording medium at a recording density of at least 100 dots/mm$^2$ in an amount ranging between $3.0 \times 10^5$ and $3.0 \times 10^6$ pl/cm$^2$.

28. The ink-jet process of claim 27, wherein said recording process is an on-demand system.

29. The ink-jet process of claim 28, wherein said recording density is at most 576 dots/mm$^2$.

30. The ink-jet process of claim 29, wherein said recording density is at least 196 dots/mm$^2$.

31. The ink-jet recording process of claim 27, wherein said inks are adhered in an amount ranging between $5.0 \times 10^5$ and $2.5 \times 10^6$ pl/cm$^2$.

32. The ink-jet recording process of claim 30, wherein said inks are adhered in an amount ranging between $1.0 \times 10^6$ and $2.0 \times 10^6$ pl/cm$^2$.

33. The ink-jet recording process of claim 28, wherein said inks each contain a colorant in the range of 0.5 to 10% by weight.

34. The ink-jet recording process of claim 33, wherein said recording medium is a sheet of paper having a basis weight ranging between 45 and 200 g/m$^2$.

* * * * *

UNITED STATES PATENT AND TRADEMARK OFFICE
CERTIFICATE OF CORRECTION

PATENT NO. : 4,931,810

DATED : June 5, 1990

INVENTOR(S) : Iwata et al.

It is certified that error appears in the above-identified patent and that said Letters Patent is hereby corrected as shown below:

COLUMN 1

Line 21, "obtain;" should read --obtain:--; and

Line 30, "enty" should read --ency--.

COLUMN 2

Line 28, "grade." should read --quality.--.

COLUMN 3

Line 35, "is not particular" should be deleted;

Line 42, "characteristic;" should read --characteristic.-- and

Line 45, "character/" should read --character,--.

UNITED STATES PATENT AND TRADEMARK OFFICE
CERTIFICATE OF CORRECTION

PATENT NO. : 4,931,810

DATED : June 5, 1990

INVENTOR(S) : Iwata et al.

It is certified that error appears in the above-identified patent and that said Letters Patent is hereby corrected as shown below:

COLUMN 4

Line 28, "mis-direction" should read --misdirection--;

Line 29, "occur" should read --occurs--;

Line 44, "are" should be deleted; "droplets face," should read --droplets,--; and delete "the";

Line 45, "the dots" should be deleted; and

Line 46, "which" should read --at which the dots--.

COLUMN 5

Line 17, "amount for" should read --amount: for--;

Line 56, "if" should read --it--; and

Line 62, "described" should read --describe--.

COLUMN 6

Line 33, "called" should read --i.e.,--;

Line 45, "dry" should read --drying--;

Line 46, "knowledge," should read --knowledge--; and

Line 58, "which;" should read --which:--.

UNITED STATES PATENT AND TRADEMARK OFFICE
CERTIFICATE OF CORRECTION

PATENT NO. : 4,931,810

DATED : June 5, 1991

INVENTOR(S) : Iwata et al.

It is certified that error appears in the above-identified patent and that said Letters Patent is hereby corrected as shown below:

COLUMN 9

In TABLE 2, "Dry time (sec)" should read --Drying time (sec)--.

COLUMN 10

In TABLE 2-continued, "Dry time (sec)" should read --Drying time (sec)--; and

Line 28, "100 dots/mm$^2$ and" should read --100 dots/mm$^2$ in an amount ranging between $3.0 \times 10^5$ and--.

Signed and Sealed this

Seventeenth Day of November, 1992

Attest:

DOUGLAS B. COMER

Attesting Officer

Acting Commissioner of Patents and Trademarks